(12) United States Patent
Falkenburg et al.

(10) Patent No.: US 6,311,242 B1
(45) Date of Patent: *Oct. 30, 2001

(54) METHOD AND APPARATUS FOR SUPPORTING DYNAMIC INSERTION AND REMOVAL OF PCI DEVICES

(75) Inventors: David R. Falkenburg, San Jose, CA (US); Edwin Wynne, Plymouth, MN (US); Andrew Thaler, Saginaw, MI (US)

(73) Assignee: Apple Computer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/172,735

(22) Filed: Oct. 13, 1998

Related U.S. Application Data

(60) Provisional application No. 60/098,306, filed on Aug. 27, 1998.

(51) Int. Cl.[7] .................................................... G06F 13/00
(52) U.S. Cl. ......................... 710/103; 710/100; 710/101; 710/102; 710/104; 710/124; 710/126; 710/128; 710/129; 710/2; 710/8; 710/17; 710/27; 710/72; 345/302; 345/503; 345/520; 361/118; 361/686; 361/802
(58) Field of Search ................................. 710/103, 101, 710/102, 126, 128, 129, 124, 8, 2, 17, 27, 72, 100, 104, 130; 345/503, 520, 302, 519; 361/802, 686, 118, 736; 439/637

(56) References Cited

U.S. PATENT DOCUMENTS

| | | | |
|---|---|---|---|
| 5,210,855 | * 5/1993 | Bartol | 710/102 |
| 5,323,291 | 6/1994 | Boyle et al. | |
| 5,347,425 | 9/1994 | Herron et al. | |
| 5,386,567 | * 1/1995 | Lien et al. | 713/100 |
| 5,454,080 | * 9/1995 | Fasig et al. | 710/103 |
| 5,594,873 | * 1/1997 | Garrett | 710/101 |
| 5,655,148 | * 8/1997 | Richman et al. | 710/8 |
| 5,680,288 | * 10/1997 | Carey et al. | 361/118 |

(List continued on next page.)

OTHER PUBLICATIONS

PCI Local Bus Specification, Production Version, Revision 2.1 Jun. 1, 1995.

IEEE Std 1275–1994 Standard for Boot (Initialization Configuration) Firmware, PCI Bus Binding, Revision 1.6 draft, Oct. 24, 1995.

*Primary Examiner*—Ario Etienne
*Assistant Examiner*—Frantz B. Jean
(74) *Attorney, Agent, or Firm*—Beyer Weaver & Thomas, LLP

(57) ABSTRACT

Improved techniques for controlling buses of a computer system are disclosed such that peripheral devices (and/or their associated buses) can be connected or disconnected to the computer system while the computer system is active. The peripheral devices are connected to the computer system by being inserted into a slot or other receptacle of the computer system. The peripheral devices are disconnected from the computer system by being removed from a slot or other receptacle of the computer system. The slots or receptacles typically includes connectors designed to receive peripheral devices, such as PC CARD slots, expansion bays, and the like. Given that the peripheral devices can be inserted or removed while the computer system is active is active, the computer system according to the invention permits "hot-plugging" of peripheral devices. The invention is particularly well suited for controlling PCI buses for peripheral devices connecting to a computer system by way of peripheral ports.

24 Claims, 8 Drawing Sheets

U.S. PATENT DOCUMENTS

| | | | |
|---|---|---|---|
| 5,734,840 | * | 3/1998 | Chew et al. .......................... 710/101 |
| 5,748,980 | * | 5/1998 | Lipe et al. ............................... 710/8 |
| 5,768,541 | * | 6/1998 | Pan-Ratzlaff ........................ 710/103 |
| 5,781,744 | | 7/1998 | Johnson et al. . |
| 5,784,576 | * | 7/1998 | Guthrie et al. ....................... 710/103 |
| 5,787,246 | * | 7/1998 | Lichtman et al. ................... 709/220 |
| 5,805,412 | * | 9/1998 | Yanagisawa et al. ................ 361/686 |
| 5,809,329 | * | 9/1998 | Licthman et al. ....................... 710/8 |
| 5,815,377 | * | 9/1998 | Lund et al. .......................... 361/802 |
| 5,875,308 | * | 2/1999 | Egan et al. .......................... 710/103 |
| 5,875,310 | * | 2/1999 | Buckland et al. ................... 710/126 |
| 5,889,965 | * | 3/1999 | Wallach et al. ..................... 710/103 |
| 5,935,228 | * | 8/1999 | Shinomura .......................... 710/102 |
| 5,949,979 | * | 9/1999 | Snow et al. ......................... 710/103 |
| 5,961,352 | * | 10/1999 | Denny et al. ....................... 439/637 |
| 5,991,158 | * | 11/1999 | Chan et al. ......................... 361/736 |
| 5,996,035 | * | 11/1999 | Allen et al. ......................... 710/103 |
| 6,026,458 | * | 2/2000 | Rasums ............................... 710/103 |

* cited by examiner

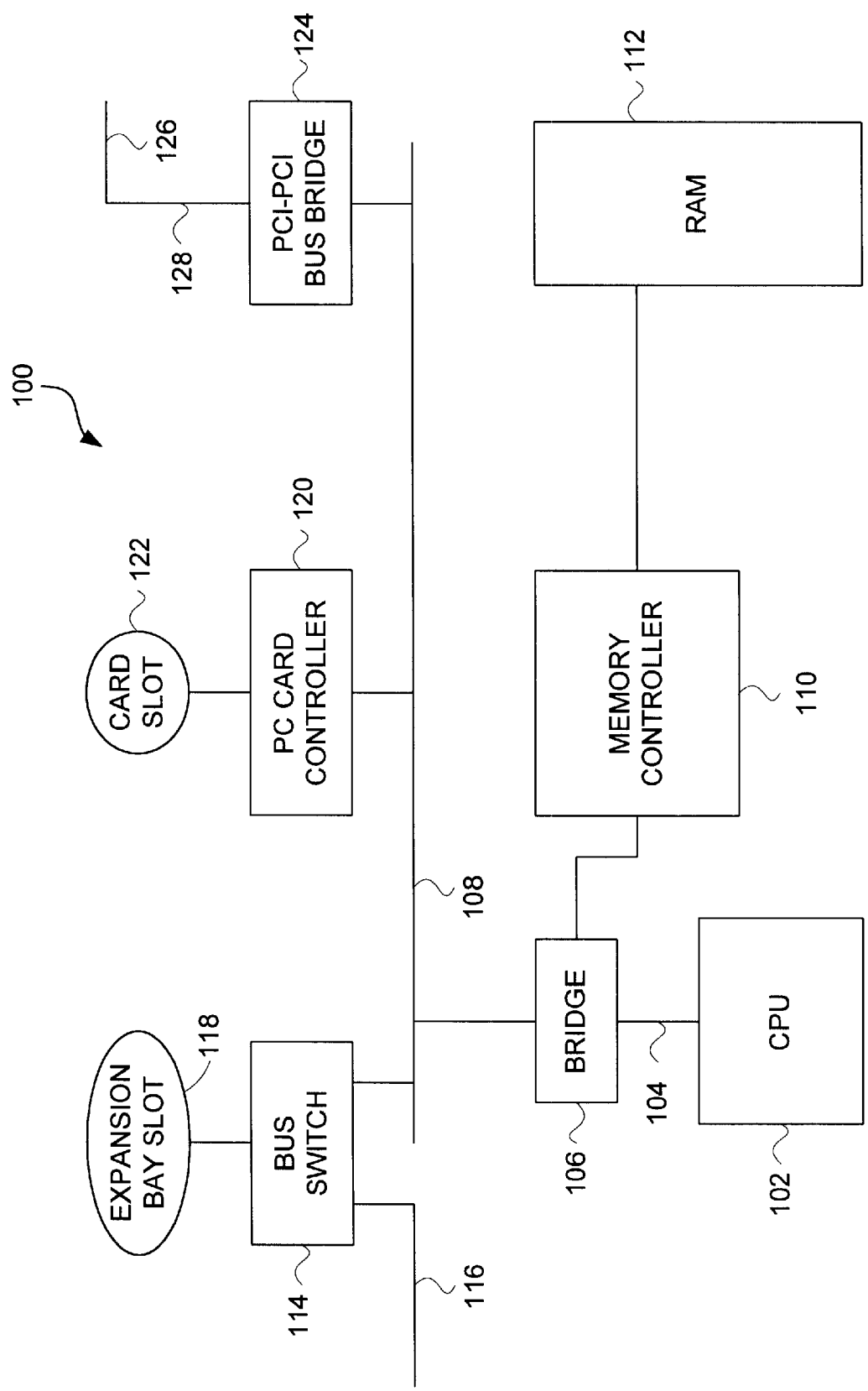

METHOD AND APPARATUS FOR SUPPORTING DYNAMIC INSERTION AND REMOVAL OF PCI DEVICES

CROSS-REFERENCE TO RELATED APPLICATION

This application claims the benefit of U.S. Provisional Application No. 60/098,306, entitled "METHOD AND APPARATUS FOR SUPPORTING DYNAMIC INSERTION AND REMOVAL OF PCI DEVICES", and filed on Aug. 27, 1998, the disclosure of which is incorporated herein by reference for all purposes.

BACKGROUND OF THE INVENTION

1. Field of the Invention

The present invention relates to computing devices and, more particularly, to computing devices supporting one or more slots for receiving peripheral devices.

2. Description of the Related Art

There are two major classes of personal computers. The first class of personal computers are known as desktop computer systems, and the second class of personal computers are known as portable computer systems. Unlike desktop computer systems, portable computer systems typically have limited sizes and their internal hardware resources are not easily modified. Hence, portable computer systems provide external slots or receptacles for receiving peripheral devices. These peripheral devices provide additional resources to the portable computer systems. The additional resources are normally additional hardware resources, such as drive storage devices, modems, network cards, memory cards, and the like.

To add additional hardware resources to a portable computing system, one often inserts a peripheral device into a suitable external slot or receptacle of the portable computing system. The suitable external slot or receptacle is one designed to receive the peripheral device. The slot or receptacle has a particular size and shape or form factor often dictated by an industry standard.

Portable computer systems typically have different types of slots or receptacles for receiving peripheral devices having a particular design or form factor. Examples of particular slots are slots for PC CARDs (formerly known as PCMCIA cards) and slots for expansion bays. Expansion bays are also known as media bays. The peripheral devices themselves add additional resources to the computer systems. These additional resources can, for example, be a floppy drive, a Compact-Disc (CD) drive, a hard drive, a Digital Video Disc (DVD) drive, a modem, a network adapter, Random Access Memory (RAM), a sound device, or a battery.

Physically connecting a peripheral device to a portable computer system requires the electrical connection of the peripheral device to the portable computer system. The electrical connection is achieved with a connector. The connector supplies various signals, including address, data, power, and various other signals, between the peripheral device and the portable computer system. A first half of the connector resides on a cable of the peripheral device or on a package housing the peripheral device, and a second half of the connector resides on the backside of the portable computer system. The insertion action involves the connection of the first half of the connector on the package for the peripheral device with the second half of the connector on the back of the portable computer system. By coupling together the two devices using the connector, the portable computer system is able to use the resources of the peripheral device.

Recently, techniques have been developed that allow the insertion and removal of peripheral devices from external slots of a portable computer system while the portable computer system is active. These techniques prevent electrical damage to the components but are often unable to configure the software structures needed by the operating system in order to utilize the peripheral device. While some approaches to configuring the software structures used by the operating system exist, they are not suitable for buses that support multiple levels of hierarchy. An example of one such bus is a PCI local bus (PCI bus). The configuration of a PCI bus requires particular probing and space allocation operations that are conventionally only available during boot-up of the computer system. See, PCI Local Bus Specification, Version 2.1, Jun. 1, 1995.

Consequently, one disadvantage of conventional techniques is their inability to configure and thus use PCI devices that are hot-plugged. Therefore, to utilize a PCI type peripheral device, a user has to power down both the portable computer system (or place in an inactive mode), insert the peripheral device into an appropriate slot of the portable computer system, and then power the portable computer system back up again (or place in an active mode) in order to use the peripheral device. Requiring powering down or an inactive state whenever connecting peripheral devices is burdensome and unsatisfactory to most users because they want the flexibility to connect and disconnect peripheral devices from the computer system at will even when the computer is in use.

Thus, there is a need for a technique whereby a peripheral device can be safely connected and thereafter used by a computer system all while the computer is in an active mode.

SUMMARY OF THE INVENTION

Broadly speaking, the invention relates to improved techniques for controlling buses of a computer system such that peripheral devices (and/or their associated buses) can be connected or disconnected to the computer system while the computer system is active. The peripheral devices are connected to the computer system by being inserted into a slot or other receptacle of the computer system. The peripheral devices are disconnected from the computer system by being removed from a slot or other receptacle of the computer system. The slots or receptacles typically includes connectors designed to receive peripheral devices, such as PC CARD slots, expansion bays, and the like. Given that the peripheral devices can be inserted or removed while the computer system is active, the computer system according to the invention permits "hot-plugging" of peripheral devices. By supporting hot-plugging, users of computer systems are free to insert and remove peripheral devices at will without having to worry about damaging the peripheral devices or the computer system. The invention is particularly well suited for controlling PCI buses for peripheral devices connecting to a computer system by way of peripheral ports.

The invention can be implemented in numerous ways, including as a system, an apparatus, a method, or computer readable medium. Several embodiments of the invention are summarized below.

As a method for adding a peripheral device to a peripheral bus of computer system while the computer system is operating normally, an embodiment of the invention includes the operations of detecting insertion of a first peripheral device into a slot of the computer system, after being inserted into the slot of the computer system the first peripheral device is physically coupled to the peripheral bus of the computer system; identifying or registering a bus link for the first peripheral device, the bus link extending at least between the first peripheral device and the peripheral bus; examining the bus link to identify at least one peripheral device on the peripheral bus, the at least one peripheral device including the first peripheral device; and thereafter and with separate processing components than that for the examining, configuring the computer system for utilization of the bus link and the first peripheral device thereon.

As a method for adding a PCI device to a computer system while the computer system is active, where the computer system includes a name registry, device drivers, a bus system and at least one slot for receiving the PCI device being added, an embodiment of the invention includes the operations of: detecting insertion of a PCI device into a slot of the computer system; adding a PCI bus for the inserted PCI device to the bus system; determining one or more PCI devices that are on the PCI bus, the one or more PCI devices including the inserted PCI device; reading PCI configuration information for the one or more PCI devices; allocating memory space for the one or more PCI devices in accordance with the PCI configuration information associated therewith; building a name registry entry in the name registry for the one or more PCI devices; and loading appropriate device drivers for the one or more PCI devices.

As a method for managing removal of a peripheral device from a slot of a computer system, an embodiment of the invention includes the operations of: detecting removal of a first peripheral device from a slot of the computer system, the slot previously containing the first peripheral device with the first peripheral device physically coupled to a peripheral bus of the computer system; providing an initial notification to a device driver associated with the first peripheral device that the first peripheral device has been physically removed from the slot of the computer system; and thereafter, once processing availability for the computer system becomes available, completing management of the removal of the first peripheral device from the slot of the computer system.

As a method for adding a media device to an expansion bay of a computer system while the computer system is active, the computer system including a name registry, device drivers, and a bus system, an embodiment of the invention includes the operations of: detecting insertion of a media device into the expansion bay of the computer system; supplying power to the expansion bay after the detecting detects the insertion of the media device into the expansion bay; reading a device identifier for the media device inserted in the expansion bay; configuring the expansion bay to use a PCI bus to link to the bus system when the device identifier indicates that the media device is an inserted PCI device; determining one or more PCI devices that are on the PCI bus, the one or more PCI devices including the inserted PCI device; reading PCI configuration information for the one or more PCI devices; allocating memory space for the one or more PCI devices in accordance with the PCI configuration information associated therewith; building a name registry entry in the name registry for the one or more PCI devices; and loading appropriate device drivers for the one or more PCI devices.

As a computer readable medium having program instructions for managing addition of a peripheral device to a peripheral bus of computer system while the computer system is active, an embodiment of the invention includes: first program instructions for detecting insertion of a first peripheral device into a slot of the computer system; second program instructions for identifying or registering a bus link for the first peripheral device, the bus link extending at least between the first peripheral device and the peripheral bus; third program instructions for examining the bus link to identify at least one peripheral device on the peripheral bus, the at least one peripheral device including the first peripheral device; and fourth program instructions for thereafter configuring the computer system for utilization of the bus link and the first peripheral device thereon.

As a computer readable medium having program instructions for managing removal of a peripheral device from a slot of a computer system, an embodiment of the invention includes: first program instructions for detecting removal of a first peripheral device from a slot of the computer system, the slot previously containing the first peripheral device with the first peripheral device physically coupled to a peripheral bus of the computer system; second program instructions for providing an initial notification to a device driver associated with the first peripheral device that the first peripheral device has been physically removed from the slot of the computer system; and third program instructions for thereafter completing management of the removal of the first peripheral device from the slot of the computer system once processing availability for the computer system becomes available.

As a computer system, an embodiment of the invention includes: a slot for receiving a removable peripheral device, the slot triggers an interrupt on insertion of the removable peripheral device into the slot; a memory system; and a device insertion controller. The device insertion controller operates to configure a peripheral bus for use by the removable peripheral device that has been inserted into the slot. The device insertion controller probes the peripheral bus to determine one or more peripheral devices that are on the peripheral bus, obtains configuration information for the one or more peripheral devices, allocates memory space within the memory system for the one or more peripheral devices in accordance with the configuration information associated therewith, builds a name registry entry in a name registry within the memory system for the one or more peripheral devices, and loads appropriate device drivers for the one or more peripheral devices into the system memory.

The invention has various advantages depending on the aspects of the invention being implemented. One advantage of the invention is that peripheral devices are able to be safely connected and then used without requiring power-down of the computer system or placing it in an inactive state. Another advantage of the invention is that peripheral devices are able to be safely disconnected with without requiring power-down of the computer system or placing it in an inactive state. Still another advantage of the invention is that the invention is well suited for peripheral buses that have levels of hierarchy such as PCI buses.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1 is a block diagram of a computer system according to an embodiment of the invention;

DETAILED DESCRIPTION OF THE INVENTION

Figure 2A:
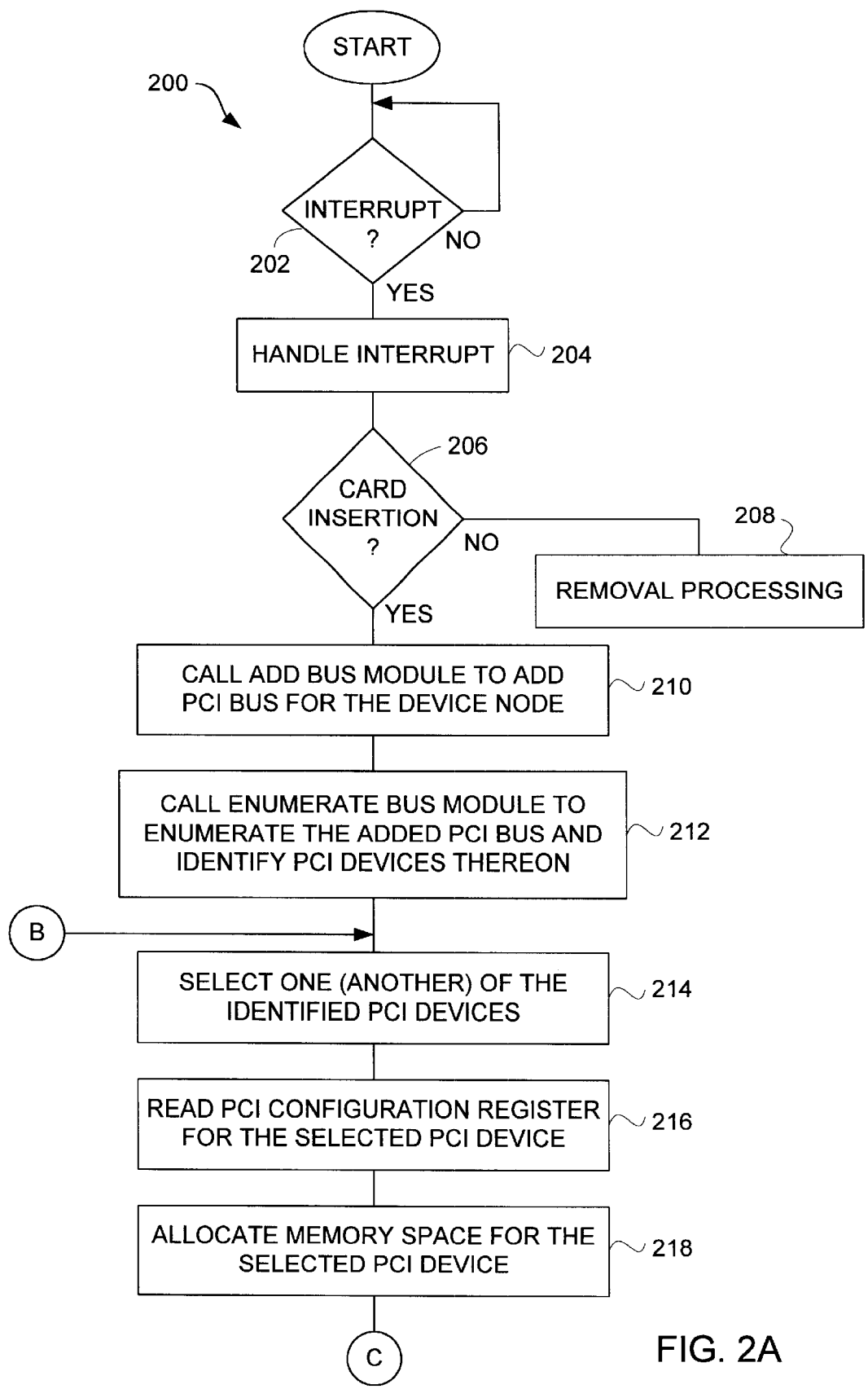
FIGS. 2A and 2B are flow diagrams of insertion-removal processing according to an embodiment of the invention.

The invention relates to improved techniques for controlling buses of a computer system such that peripheral devices (and/or their associated buses) can be connected or disconnected to the computer system while the computer system is active. The peripheral devices are connected to the computer system by being inserted into a slot or other receptacle of the computer system. The peripheral devices are disconnected from the computer system by being removed from a slot or other receptacle of the computer system. The slots or receptacles are, for example, PC CARD slots, expansion bays, and the like. The peripheral devices (when connected to slots or receptacles) provide additional resources to the computer system. Examples of the peripheral devices include a floppy drive, a hard drive, a CD-ROM drive, a DVD drive, or a battery.

Given that the peripheral devices can be inserted or removed while the computer system is active is active, the computer system according to the invention permits "hot-plugging" of peripheral devices. By supporting hot-plugging, users of computer systems are free to insert and remove peripheral devices at will without having to worry about damaging the peripheral devices or the computer system. The invention is particularly well suited for controlling PCI buses for peripheral devices connecting to a computer system by way of peripheral ports.

Embodiments of the invention are discussed below with reference to FIGS. 1–6. However, those skilled in the art will readily appreciate that the detailed description given herein with respect to these figures is for explanatory purposes as the invention extends beyond these limited embodiments.

FIG. 1 is a block diagram of a computer system 100 according to an embodiment of the invention. The computer system 100 includes a central processing (CPU) 102 that utilizes a system bus 104. The system bus 104 is connected between the CPU 102 and a bridge 106. The bridge serves to link the system bus 104 to a peripheral bus 108. The bridge 106 allows the system bus 104 to follow a different bus standard than that of the peripheral bus 108. For example, the system bus 104 can be a EISA bus and the peripheral bus can be a PCI bus. The bridge 106 also couples to a memory controller 110 that controls access to a random access memory (RAM) 112. Hence, either the system bus 104 or the peripheral bus 108 are able to couple to the memory controller 110 through the bridge 106.

The computer system 100 is designed to include and support various slots (or receptacles) that allow for the connection of various peripheral devices to the computer system 100. These various peripheral devices communicate with the computer system 100 via the peripheral bus 108. In this embodiment, the various slots of the computer system include a PC CARD slot, and expansion bay slot, and an additional peripheral bus slot.

A bus switch 114 is couple to the peripheral bus 108 and another bus 116. The bus switch 114 operates to switch either the peripheral bus 108 or the another bus 116 to an expansion bay slot 118 of the computer system 100. Depending upon the setting of the bus switch 114, either the peripheral bus 108 or the another bus 116 is supplied to the expansion bay slot 118. In this manner, the expansion bay slot 118 is able to receive a peripheral device into the expansion bay slot 118 and thereby communicate with other components of the computer system 100 via the bus selected by the bus switch 114. The bus switch 114 thus allows the expansion bay slot 118 of the computer system 100 to support multiple bus types. Thus, the functionality or resources of the inserted peripheral device can be utilized by the computer system.

The computer system 100 also includes a PC CARD controller 120 that couples to the peripheral bus 108. The PC CARD controller 120 controls a card slot 122 that is able to receive a PC CARD peripheral device. Upon insertion of a PC CARD into the card slot 122, the PC CARD controller 120 is able to allow the functionality or resources associated with the inserted PC CARD to be utilized by the computer system 100 via the peripheral bus 108.

The computer system 100 also includes a PCI—PCI bus bridge 124 that allows a secondary peripheral bus 126 to be coupled to the peripheral bus 108 (internal peripheral bus). In this manner, the PCI—PCI bus bridge 124 allows the expansion of the peripheral bus 108 (i.e., a PCI bus) to additional PCI buses, namely the secondary peripheral bus 126. The secondary peripheral bus 126 couples to the computer system 100 via an additional peripheral bus slot 128. The secondary peripheral bus 126 can be internal or external to the computer system 100.

The operation of the computer system 100 according to the invention is such that media devices, PC CARDs or other peripheral devices (and their associated buses) can be inserted into slots or other receptacles (e.g., the expansion bay slot 118, the card slot 122, or the PCI-to-PCI bus bridge 124) of the computer system 100 to provide additional resources or functionality to the computer system 100. Additionally, these devices (and the associated buses) can be inserted or removed from the associated slot or receptacles while the computer system 100 is in an active mode (or state) and thus not in an inactive mode, powered down or otherwise set to a specialized state. Such insertion and removal during active mode is often referred to as "hot-plugging".

The processing associated with the insertion and/or removal of peripheral devices from a slot or receptacle of the computer system 100 is detailed below in FIGS. 2A–5B.

Figure 2B:
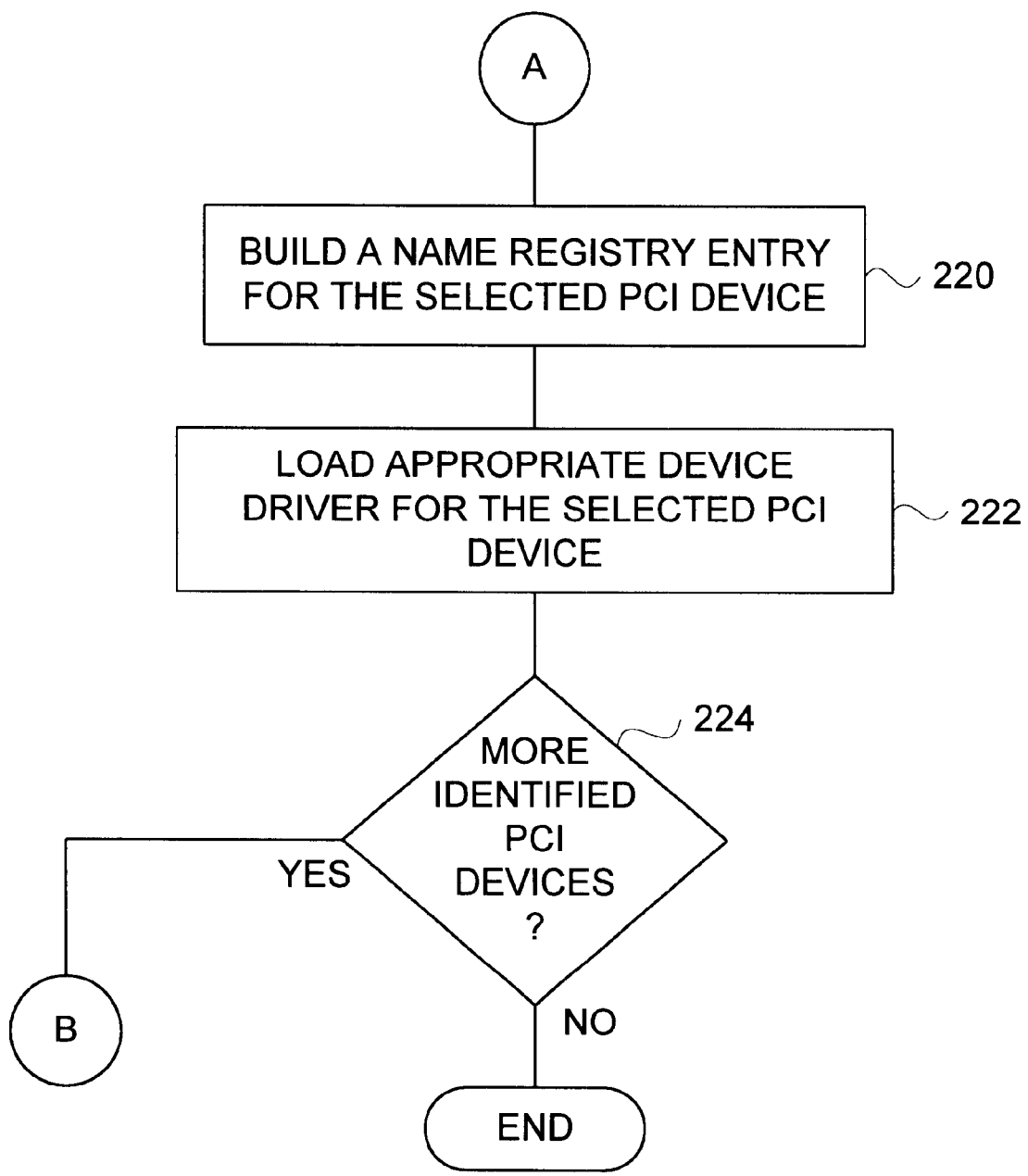

FIGS. 2A and 2B are flow diagrams of insertion-removal processing 200 according to an embodiment of the invention. The insertion-removal processing 200 is, for example, performed by a combination of hardware and software associated with the computer system. The insertion portion of the insertion-removal processing 200 is primarily associated with insertion of a PC CARD into a slot of a computer system. For example, the slot can be the card slot 122 of the computer system 100 illustrated in FIG. 1. The removal portion of the insertion-removal processing 200 is primarily associated with removal of a PC CARD from a slot of the computer system.

The insertion-removal processing 200 initially begins when an interrupt is detected. In other words, insertion of a peripheral device into a slot (e.g., a card slot) or removal of a peripheral device from a slot causes a hardware interrupt within a computer system. When this interrupt occurs, the insertion-removal processing 200 is performed. A decision block 202 determines whether such an interrupt has occurred. If such an interrupt has not yet occurred, the insertion-removal processing 200 essentially waits for the occurrence of such an interrupt.

Once an interrupt has occurred, the interrupt is handled 204 by the computer system. Typically, the computer system is capable of handling a variety of different types of interrupts, thus the interrupt associated with insertion of a peripheral device into a slot is a particular type of interrupt. Here, the handling of the interrupt operates to retrieve interrupt information that identifies the interrupt. In this representative embodiment, the interrupt corresponds to either insertion or removal of a PC CARD from a slot of a computer system.

Next, a decision block 206 determines whether a card insertion has occurred. The insertion of a card is determined based on the type of interrupt that has been detected and perhaps the state of one or more lines or pins of the slot. A system hardware register is used to distinguish between insertion and removal. The interrupt information determines the type of interrupt that has occurred. In any event, when the decision block 206 determines that a card insertion has not occurred, then the insertion-removal processing 200 has determined that removal processing 208 should be performed because a card removal has occurred. The card removal processing according to one embodiment of the invention is detailed in FIG. 3.

Figure 4:
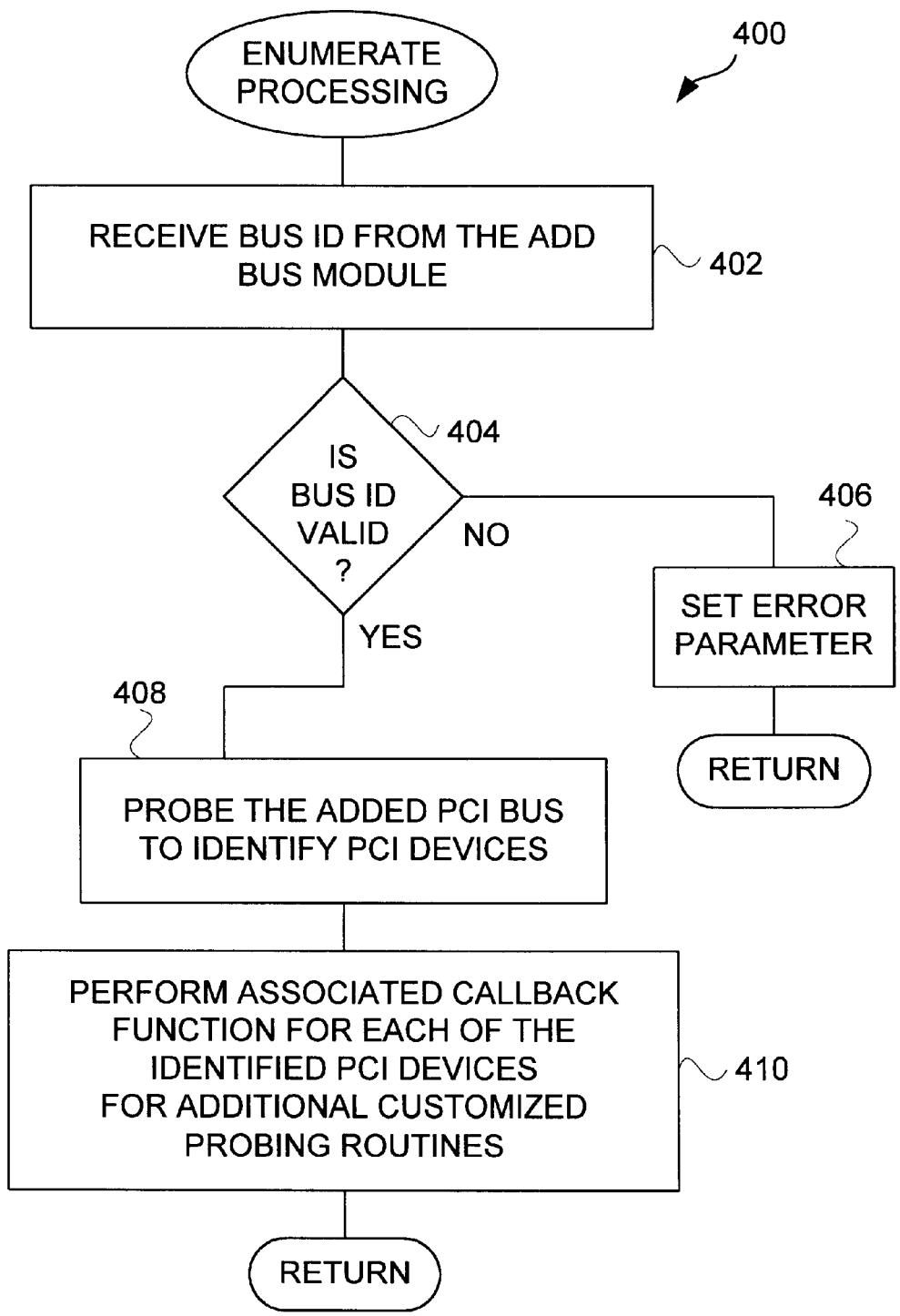
FIG. 4 is a flow diagram of enumerate processing according to an embodiment of the invention.

On the other hand, when the decision block 206 determines that a card insertion has occurred, then the insertion portion (insertion processing) of the insertion-removal processing 200 is performed. Initially, when the insertion portion of the insertion-processing 200 begins, an add bus module is called 210 to add a PCI bus for a device node. The device node is a node on an internal peripheral bus for the inserted card. Here, a PCI bus (or link) is provided within the computer system such that it couples the device node (and the inserted card) with the internal peripheral bus. The bus module can also reserve other bus identifiers for subordinate buses to the added PCI bus. Next, the insertion processing calls 212 an enumerate bus module to enumerate the added PCI bus and to identify PCI devices thereon. FIG. 4 explains in more detail the processing performed by the enumerate bus module according to one embodiment of the invention.

After the added PCI bus and the PCI devices thereon are enumerated, one of the identified PCI devices is selected 214 for further processing. Then, a PCI configuration register for the selected PCI device is read 216. All PCI devices include configuration registers. After reading the PCI configuration register, the insertion processing understands a size of memory space that the selected PCI device requires. Thereafter, memory space for the selected PCI device is allocated 218. The memory space (i.e., physical address space) being allocated is normally RAM, such as the RAM 112 illustrated in FIG. 1. Typically, the selected PCI device is either an input/output (I/O) type peripheral device or a memory type peripheral device. Hence, in a memory mapped computer system, the allocation of the memory space can be I/O memory space for I/O type peripheral device or regular memory space for memory type peripheral devices. As examples, the size of memory space required by the selected PCI device is normally in the range of 4 bytes to 256 megabytes.

After allocating the memory space, a name registry entry is built 220 for the selected PCI device. The name registry entry is built in a name registry that is provided by the computer system. Ordinary, an operating system for the computer system manages the name registry. Here, the insertion processing is able to interact with the operating system to add the name registry entry to the name registry. Thereafter, an appropriate device driver for the selected PCI device is loaded 222. The operating system also typically includes a device driver loader that can be used to load the appropriate device driver.

A decision block 224 then determines whether more identified PCI devices need to be processed. The number of the identified PCI devices is determined in block 212. If there are more identified PCI devices to be processed, the insertion processing returns to repeat blocks 214–224 until all of the identified PCI devices have been processed. Once the decision block 224 determines that the identified PCI devices have all been processed, then the insertion portion of the insertion-removal processing 200 is complete and ends.

Accordingly, the insertion-removal processing 200 operates on detection of an interrupt associated with the insertion or removal of a card into a slot of a computer system to add or remove a bus to the peripheral bus for use with the card. In the case of card insertion, the insertion processing also operates to configure each of the devices on the added bus. The configuration of the devices includes performance of the operations of allocating memory space, building a name registry entry in a name registry, and loading an appropriate device driver. All of this insertion or removal processing occurs while the computer system is active. Thus, cards are able to be inserted (i.e., hot-plugged) into a slot of the computer system or removed (i.e., hot-unplugged) from a slot of the computer system while the computer system is active.

Figure 3:
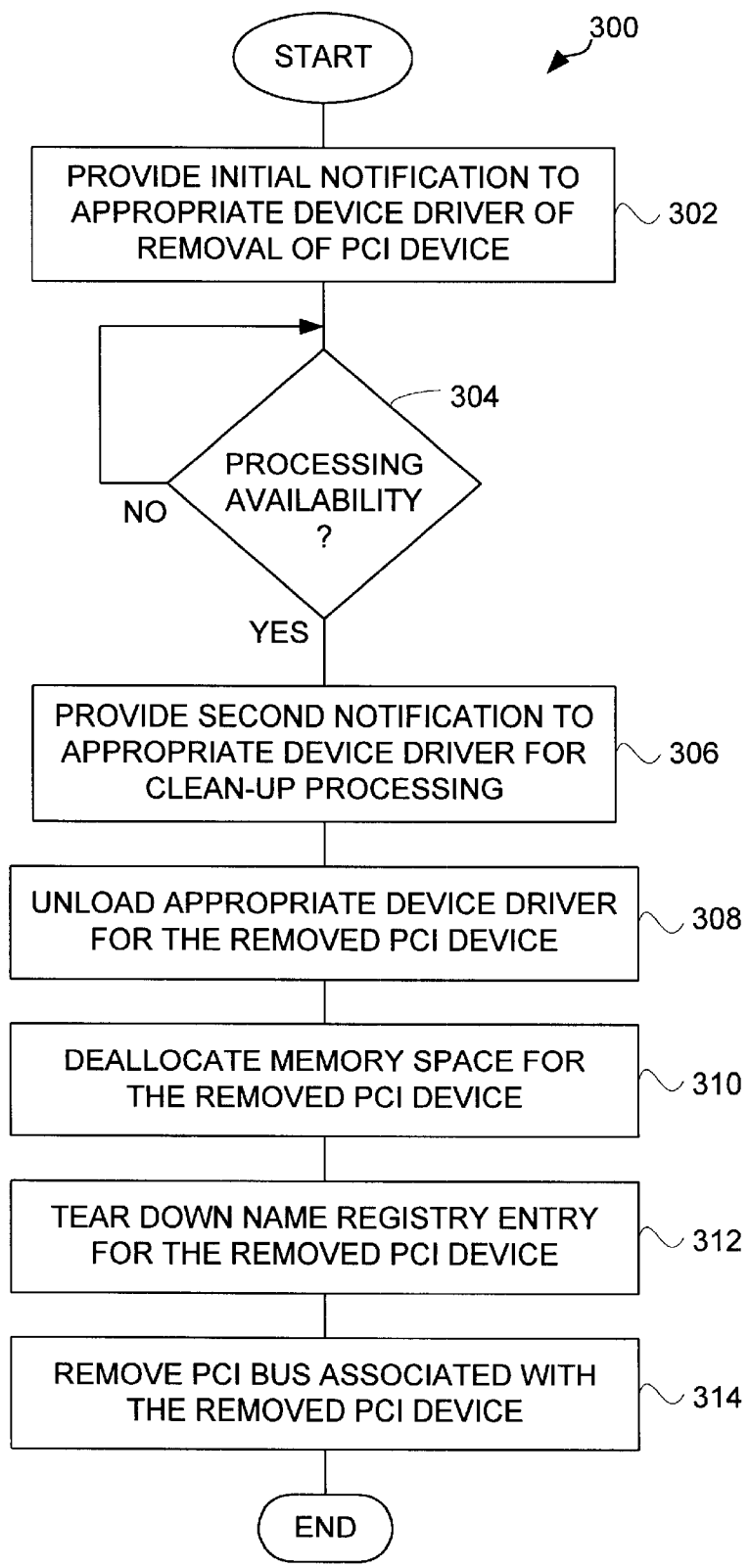
FIG. 3 is a flow diagram of removal processing according to an embodiment of the invention.

FIG. 3 is a flow diagram of removal processing 300 according to an embodiment of the invention. The removal processing 300 is, for example, performed by the removal processing block 208 illustrated in FIG. 2A.

The removal processing 300 initially provides 302 an initial notification to an appropriate device driver. The initial notification informs the appropriate device driver that its associated PCI device has been removed from the slot of the computer system. Next, a decision block 304 determines whether the computer system has processing availability. Here, processing availability refers to the condition in which the computer system has at most only a minimal amount of real-time processing to perform such that the computer system is able perform background or management tasks for the computer system without hindering the other real-time processing also being performed. Hence, the decision block 304 causes the removal processing 300 to wait until the computer system has processing availability. Once the decision block 304 determines that the computer system has processing availability, then the removal processing 300 is continues and operates to perform the major operations associated with the removal of the PCI device.

Once the removal processing continues, a second notification is provided 306 to the appropriate device driver. Upon receiving the second notification, the appropriate device driver understands that it should perform clean-up processing because the appropriate device driver is soon to be unloaded from the computer system. After the second notification is provided 306 and the appropriate device driver completes its clean-up processing, the appropriate device driver for the removed PCI device is unloaded 308. Then, the memory space previously allocated for the removed PCI device is deallocated 310. The name registry entry for the removed PCI device is also torn down 312. Thereafter, the PCI bus associated with the removed PCI device is removed 314. The removal of the PCI bus associated with the removed device eliminates the associated PCI bus and its coupling to the internal peripheral bus. At this point, to the computer system, it appears as if the removed PCI device and the PCI bus associated therewith were never present. Following block 314, the removal processing 300 is complete and ends.

The removal processing uses a two step notification process to initially notify the appropriate device driver of the removal of the PCI device so that in a "hot-removal" or "hot-unplugged" situation, the appropriate device driver is almost instantly notified that the PCI device has been removed. Then, the appropriate device driver will not attempt to utilize the PCI device which is no longer present in the slot or receptacle of the computer system. Thereafter, once the computer system has processing availability, the computer system can perform the administrative processing tasks associated with the removal of the previously assigned structures within the computer system for use by the previously inserted, now removed PCI device. Hence, the major processing requirements of the removal processing 300 are deferred until the computer system has sufficient processing availability so that the performance of the computer system, particularly if real-time performance, is not affected. Further, the removal of the previously assigned structures (e.g., device driver, memory space and name registry) frees up system resources for use by entities without having to reboot the system or switch between active and inactive modes.

FIG. 4 is a flow diagram of enumerate processing 400 according to an embodiment of the invention. The enumerate processing 400 is, for example, the processing performed by the enumerate bus module associated with block 212 of the insertion processing illustrated in FIG. 2A.

The enumerate processing 400 initially receives 402 a bus identifier (ID) from the add bus module. In other words, the add bus module operates to add a PCI bus to the computer system, and then assigns a bus ID to the bus that was added. Thereafter, the bus ID is provided to the enumerate bus module.

Once the bus ID has been received, a decision block 404 determines whether the bus ID is valid. The bus ID is valid so long as it lies within the currently allocated range of bus IDs. If the decision block 404 determines that the bus ID is not valid, then the enumerate processing 400 sets 406 an error parameter to signal that the enumerate processing 400 did not complete properly. In such case, the insertion processing is unable to properly handle the insertion of the card. Hence, following block 406, the enumerate processing 400 is complete and returns.

On the other hand, when the decision block 404 determines that the bus ID is valid, then the enumerate processing 400 probes 408 the added PCI bus to identify PCI devices on the added PCI bus. Then, for each of the identified PCI devices, an associated callback function can be performed 410. The performance of the associated callback functions are used to provide additional processing for the PCI devices. For example, the additional processing can include additional customized probing routines that can be supplied with the PCI devices. These additional customized probing routines can operate in various ways and typically serve to further examine or identify the particular identified PCI devices. By allowing for the separate callback functions, the probing process in able to be easily updated and changed without affecting the architecture of the enumerate processing 400.

Figure 5A:
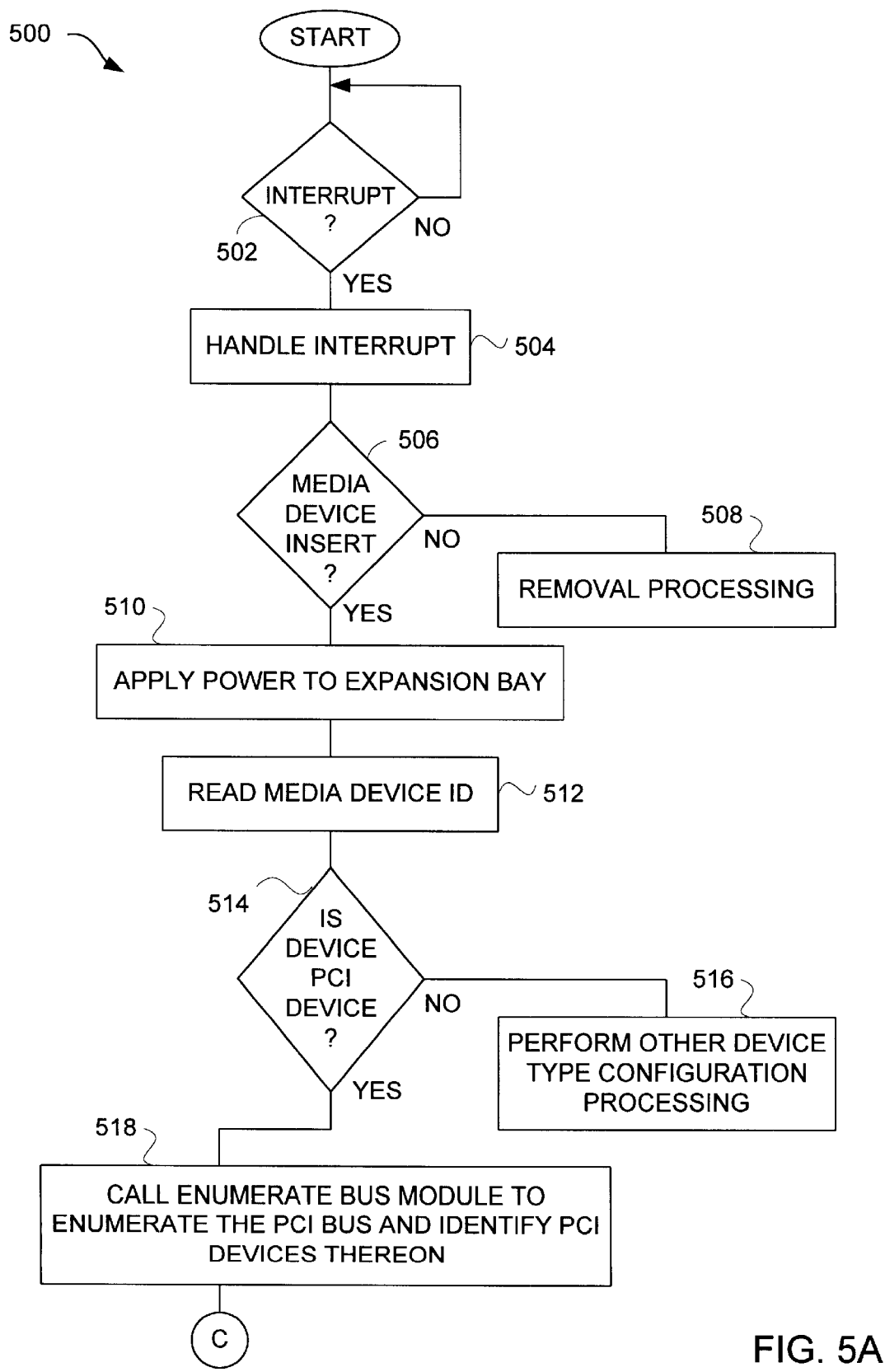
FIGS. 5A and 5B are flow diagrams of insertion-removal processing according to another embodiment of the invention.
Figure 5B:
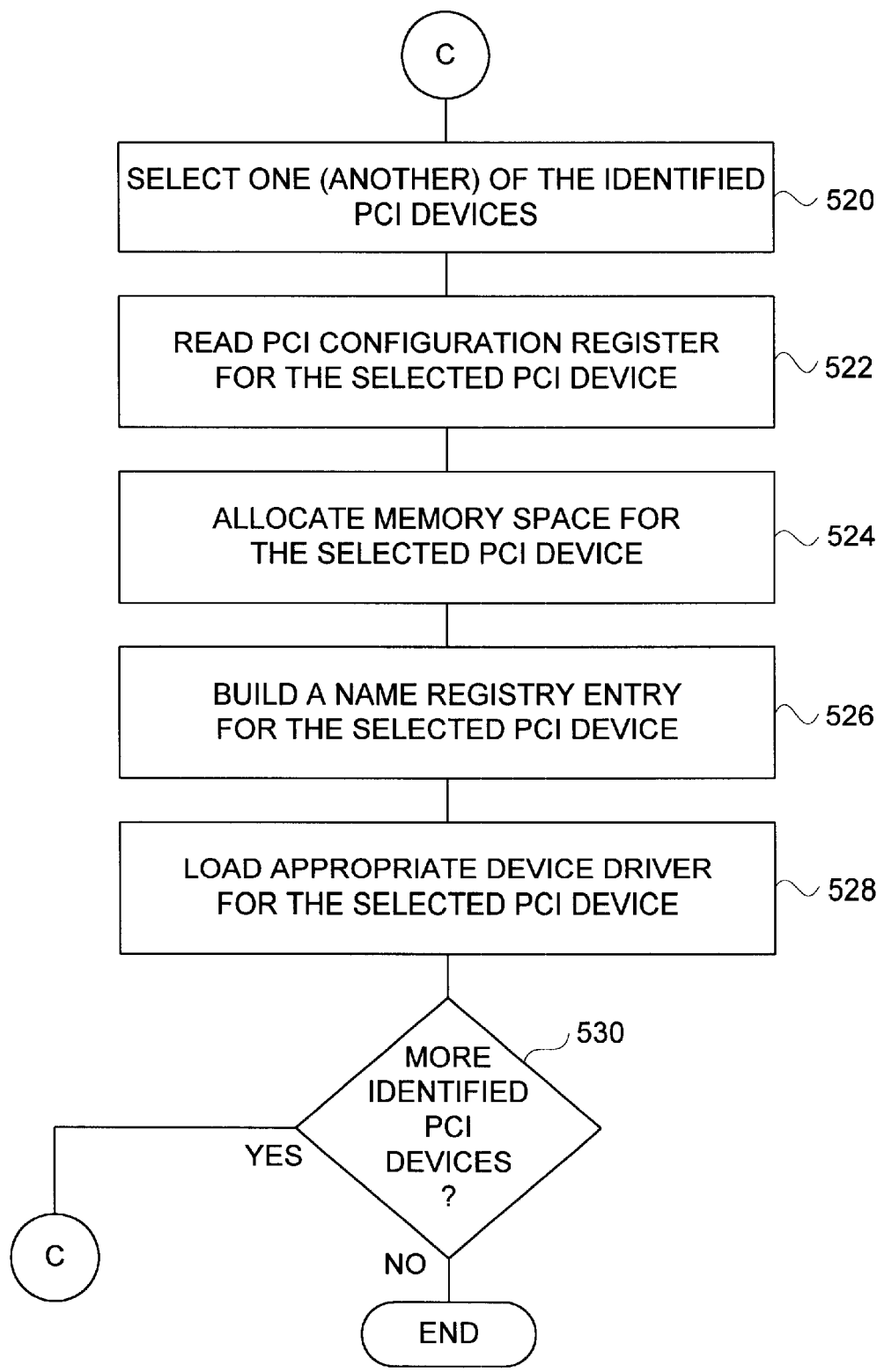

FIGS. 5A and 5B are flow diagrams of insertion-removal processing 500 according to another embodiment of the invention. The insertion-removal processing 500 is particularly suited for processing to be performed upon insertion of a media device into an expansion bay of a computer system. For example, with respect to FIG. 1, a media device can be inserted into the expansion bay slot 118 of the computer system 100.

The insertion-removal processing 500 initially begins upon the detection of an interrupt. Hence, a decision block 502 causes the insertion-removal processing 500 to essentially wait until an interrupt has occurred. Once an interrupt has occurred, the insertion-removal processing 500 handles 504 the interrupt. With respect to insertion processing, the particular interrupt involved is an insertion of a media device into the expansion bay. With respect to removal processing, the particular interrupt involved is a removal of a media device from an expansion bay. It is only these types of interrupts that are handled and further processed by the insertion-removal processing 500. Here, the handling 504 of the interrupt determines whether the interrupt is for the expansion bay. The processing depicted in FIG. 5A, namely blocks 502 and 504, assume that the interrupt is for the expansion bay. If the interrupt were not for the expansion bay, then the processing would not follow the insertion-removal processing 500.

A decision block 506 determines whether a media device has been inserted into an expansion bay of the computer system. When the decision block 506 determines that the interrupt does not signal that a media device has been inserted, then removal processing 508 is performed. The removal processing 508 performed is similar to the removal processing 300 described above with respect to FIG. 3 and is therefore not further described.

On the other hand, when the decision block 506 determines that a media device has been inserted into the expansion bay, then insertion processing is performed. Namely, power is applied 510 to the expansion bay. Then, a media device identifier (ID) is read 512. Typically, the media device inserted into the expansion bay operates to self identify itself to the computer system through the use of one or more pins of the media device. An example of such identification is described in U.S. Pat. No. 5,781,744 which is hereby incorporated by reference.

After the media device ID is read 512, a decision block 514 determines whether the media device is a PCI device. If the decision block 514 determines that the media device is not a PCI device, then the insertion processing performs 516 other device type configuration processing for the non-PCI device. The other device type configuration processing is generally known in the art. Examples of non-PCI devices include ATA devices and floppy disk drive devices, which are identified by device identifiers, see, e.g., U.S. Pat. No. 5,781,744.

On the other hand, when the decision block 514 determines that the media device is a PCI device, then an enumerate bus module is called 518. The enumerate bus module operates to enumerate the PCI bus and to identify PCI devices on the PCI bus. The enumerate bus module operates, for example, in accordance with the enumerate processing 400 illustrated in FIG. 4.

Then, for each of the identified PCI devices, configuration processing is performed so that each of the PCI devices can be properly configured within the computer system, while the computer system is active and without needing to reboot the computer system. Specifically, one of the identified PCI devices is selected 520. Then, a PCI configuration register is read 522 for the selected PCI device. Next, memory space for the selected PCI device is allocated 524. After allocating the memory space, a name registry entry for the selected PCI device is built 526. Then, an appropriate device driver for the selected PCI device is loaded 528.

Thereafter, a decision block 530 determines where there are more identified PCI devices to be processed. When the decision block 530 determines that there are more identified PCI devices to be processed, then the insertion processing returns to repeat blocks 520–528 for each of the identified PCI devices. Hence, once the decision block 530 determines that all of the identified PCI devices have been processed, and thus configured, the insertion processing is complete and ends.

Figure 6:
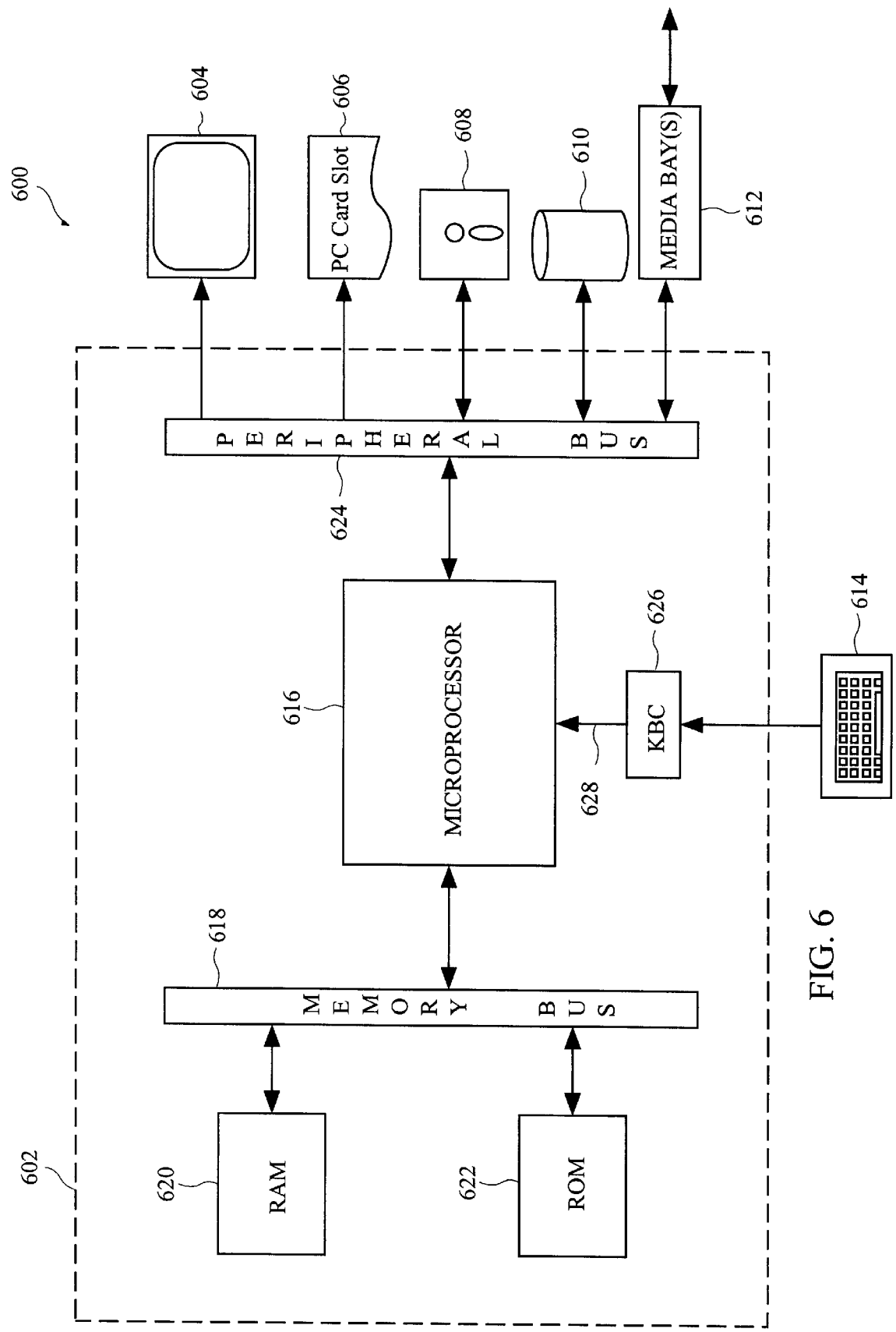
FIG. 6 is a block diagram of an exemplary computer system for carrying out the processing according to the invention.

FIG. 6 is a block diagram of an exemplary computer system 600 for carrying out the processing according to the invention. The computer system 600 includes a digital computer 602, a display screen (or monitor) 604, a PC CARD slot 606, a floppy disk drive 608, a hard disk drive 610, media bay(s) 612, and a keyboard 614. The digital computer 602 includes a microprocessor 616, a memory bus 618, random access memory (RAM) 620, read only memory (ROM) 622, a peripheral bus 624, and a keyboard controller 626. The digital computer 602 can be a personal computer, a workstation computer, or some other type of computer.

The microprocessor 616 is a general purpose digital processor which controls the operation of the computer system 600. The microprocessor 616 can be a single-chip processor or can be implemented with multiple components. Using instructions retrieved from memory, the microprocessor 616 controls the reception and manipulation of input data and the output and display of data on output devices. According to the invention, as described above, some particular functions of microprocessor 616 is to execute program code according to the flow diagrams of FIGS. 2A–5B to permit the hot-plugging and unplugging of peripheral devices to the peripheral bus 624. In one embodiment, the peripheral devices are PCI devices the peripheral bus 624 is a PCI bus.

The memory bus 618 is used by the microprocessor 616 to access the RAM 620 and the ROM 622. The RAM 620 is used by the microprocessor 616 as a general storage area and as scratch-pad memory, and can also be used to store input data and processed data. The RAM 620 also preferably stores the various data structures illustrated in FIG. 5. The ROM 622 can be used to store instructions or program code followed by the microprocessor 616 as well as other data.

The peripheral bus 624 is used to access the input, output, and storage devices used by the digital computer 602. In the described embodiment, these devices include the display screen 604, the PC CARD slot 606, the floppy disk drive 608, the hard disk drive 610, and the media bay(s) 612. The keyboard controller 626 is used to receive input from the keyboard 614 and send decoded symbols for each pressed key to the microprocessor 616 over bus 628.

The display screen 604 is an output device that displays images of data provided by the microprocessor 616 via the peripheral bus 624 or provided by other components in the computer system 600. The PC CARD slot 606 is a slot that is externally accessible (such as a slot on a housing of a portable computer) such that a PC CARD device can be inserted into the slot to provide the computer system with the additional resources available from the PC CARD device. The PC CARD device can also thereafter be removed from the slot of the computer system 600. Examples of types of PC CARD devices include a modem, additional memory, a network adapter, and processing hardware.

The floppy disk drive 608 and the hard disk drive 610 can be used to store various types of data. The floppy disk drive 608 facilitates transporting such data to other computer systems, and hard disk drive 610 permits fast access to large amounts of stored data.

The microprocessor 616 together with an operating system operate to execute computer code and produce and use data. The computer code and data may reside on the RAM 620, the ROM 622, or the hard disk drive 620. The computer code and data could also reside on a removable program medium and loaded or installed onto the computer system 600 when needed. Removable program mediums include, for example, CD-ROM, PC-CARD, floppy disk, magnetic tape, and a network component.

The one or more media bays (expansion bays) 612 are used to receive media bay devices (expansion bay devices) to provide greater resources to the computer system. As examples, the types of devices include a floppy drive, a hard drive, a CD-ROM drive, a DVD drive, or a battery. The media bays are accessible from external to the computer system so that media bay devices can be easily be inserted into the media bays or removed from the media bays. The removability of the media bay devices allows a few media bays to support a variety of different types of devices in a flexible manner.

The keyboard 614 is used by a user to input commands and other instructions to the computer system 600. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

The invention has various advantages depending on the aspects of the invention being implemented. One advantage of the invention is that peripheral devices are able to be safely connected and then used without requiring power-down of the computer system or placing it in an inactive state. Another advantage of the invention is that peripheral devices are able to be safely disconnected with without requiring power-down of the computer system or placing it in an inactive state. Still another advantage of the invention is that the invention is well suited for peripheral buses that have levels of hierarchy such as PCI buses.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for adding a peripheral device to a peripheral bus of computer system while the computer system is operating normally, said method comprising:

(a) detecting insertion of a first peripheral device into a slot of the computer system, after being inserted into the slot of the computer system the first peripheral device is physically coupled to the peripheral bus of the computer system;

(b) identifying or registering a bus link for the first peripheral device, the bus link extending at least between the first peripheral device and the peripheral bus, and the bus link supporting multiple levels of hierarchy;

(c) examining the bus link, including the multiple levels of hierarchy, to identify at least one peripheral device on the peripheral bus, the at least one peripheral device being one or more peripheral devices other than the first peripheral device; and (d) thereafter and with separate processing components than that for said examining (c), configuring the computer system for utilization of the bus link and the first peripheral device thereon.

2. A method as recited in claim 1, wherein said configuring (d) comprises:

(d1) reading configuration information for the first peripheral device; and (d2) allocating memory space for the first peripheral device in accordance with the configuration information.

3. A method as recited in claim 2, wherein said configuring (d) further comprises:

(d3) building a name registry entry in the name registry for the first peripheral device; and (d4) loading an appropriate device driver for the first peripheral device.

4. A method as recited in claim 2, wherein said identifying or registering (b) operates to add the bus link for the first peripheral device to the peripheral bus.

5. A method as recited in claim 2, wherein said identifying or registering (b) identifies the bus link when the bus link has been previously registered.

6. A method as recited in claim 1, wherein said detecting (a) operates to detect the first peripheral device being hot-plugged into the slot of the computer system.

7. A method as recited in claim 6, wherein the first peripheral device is a PCI device.

8. A method as recited in claim 6, wherein the slot of the computer system is an expansion bay.

9. A method as recited in claim 6, wherein the first peripheral device is a PC CARD device, and wherein the slot of the computer system receives PC CARD devices.

10. A method for adding a PCI device to a computer system while the computer system is active, the computer system including a name registry, device drivers, a bus system and at least one slot for receiving the PCI device being added, said method comprising:

(a) detecting insertion of a PCI device into a slot of the computer system;

(b) adding a PCI bus for the inserted PCI device to the bus system, the PCI bus supporting multiple levels of hierarchy;

(c) determining one or more PCI devices that are on the PCI bus, the one or more PCI devices being one or more PCI devices other than the inserted PCI device;

(d) reading PCI configuration information for the one or more PCI devices;

(e) allocating memory space for the one or more PCI devices in accordance with the PCI configuration information associated therewith;

(f) building a name registry entry in the name registry for the one or more PCI devices; and (g) loading appropriate device drivers for the one or more PCI devices.

11. A method as recited in claim 10, wherein the PCI device is a I/O device, and wherein said allocating (e) allocates I/O type space in the memory space of the computer system.

12. A method as recited in claim 10, wherein the PCI device is a memory device, and wherein said allocating (e) allocates memory type space in the memory space of the computer system.

13. A method as recited in claim 10, wherein said determining (c) of the one or more PCI devices that are on the PCI bus, comprises:

(c1) probing the PCI bus to identify the one or more PCI devices that are on the PCI bus, the one or more PCI devices including the inserted PCI device;

(c2) thereafter performing additional specialized probing for each of the one or more PCI devices that are identified.

14. A method for adding a media device to an expansion bay of a computer system while the computer system is active, the computer system including a name registry, device drivers, and a bus system, said method comprising:

(a) detecting insertion of a media device into the expansion bay of the computer system;

(b) supplying power to the expansion bay after said detecting (a) detects the insertion of the media device into the expansion bay;

(c) reading a device identifier for the media device inserted in the expansion bay;

(d) configuring the expansion bay to use a PCI bus to link to the bus system when the device identifier indicates that the media device is an inserted PCI device, the PCI bus supporting multiple levels of hierarchy;

(e) determining one or more PCI devices that are on the PCI bus, the one or more PCI devices being one or more PCI devices other than the inserted PCI device;

(f) reading PCI configuration information for the one or more PCI devices;

(g) allocating memory space for the one or more PCI devices in accordance with the PCI configuration information associated therewith;

(h) building a name registry entry in the name registry for the one or more PCI devices; and (i) loading appropriate device drivers for the one or more PCI devices.

15. A method as recited in claim 14, wherein the inserted PCI device is a I/O device, and wherein said allocating (g) allocates I/O type space in the memory space of the computer system.

16. A method as recited in claim 14, wherein the inserted PCI device is a memory device, and wherein said allocating (g) allocates memory type space in the memory space of the computer system.

17. A method as recited in claim 14, wherein said determining (e) of the one or more PCI devices that are on the PCI bus, comprises:

(e1) probing the PCI bus to identify the one or more PCI devices that are on the PCI bus; and (e2) thereafter performing additional specialized probing for each of the one or more PCI devices that are identified.

18. A computer readable medium having program instructions for managing addition of a peripheral device to a peripheral bus of computer system while the computer system is active, said computer readable medium comprising:

first program instructions for detecting insertion of a first peripheral device into a slot of the computer system;

second program instructions for identifying or registering a bus link for the first peripheral device, the bus link extending at least between the first peripheral device and the peripheral bus, and the bus link supporting multiple levels of hierarchy;

third program instructions for examining the bus link, including the multiple levels of hierarchy, to identify at least one peripheral device on the peripheral bus besides the first peripheral device; and fourth program instructions for thereafter configuring the computer system for utilization of the bus link and the first peripheral device thereon.

19. A computer readable medium as recited in claim 18, wherein said fourth program instructions comprises:

program instructions for reading configuration information for the first peripheral device; and program instructions for allocating memory space for the first peripheral device in accordance with the configuration information.

20. A computer readable medium as recited in claim 19, wherein said fourth program instructions further comprises:

program instructions for building a name registry entry in the name registry for the first peripheral device; and program instructions for loading an appropriate device driver for the first peripheral device.

21. A computer readable medium as recited in claim 18, wherein said first program instructions operates to detect the first peripheral device being hot-plugged into the slot of the computer system, and wherein the first peripheral device is a PCI device.

22. A computer readable medium as recited in claim 18, wherein the slot of the computer system is one of a card slot or an expansion bay.

23. A computer system, comprising:

a slot for receiving a removable peripheral device, said slot triggers an interrupt on insertion of the removable peripheral device into said slot;

a memory system;

a device insertion controller that operates to configure a peripheral bus supporting multiple levels of hierarchy for use by the removable peripheral device that has been inserted into said slot, said device insertion controller probes the peripheral bus to determine a plurality of peripheral devices that are on the peripheral bus, obtains configuration information for the peripheral devices, allocates memory space within said memory system for the peripheral devices in accordance with the configuration information associated therewith, builds a name registry entry in a name registry within said memory system for each of the peripheral devices, and loads appropriate device drivers for the peripheral devices into the system memory.

24. A computer system as recited in claim 23, wherein the peripheral bus is a PCI bus, the peripheral device is a PCI device, and the one or more peripheral devices are PCI devices.

* * * * *